(12) United States Patent
Kano

(10) Patent No.: US 7,065,611 B2
(45) Date of Patent: Jun. 20, 2006

(54) METHOD FOR CONTROLLING STORAGE POLICY ACCORDING TO VOLUME ACTIVITY

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/880,661

(22) Filed: Jun. 29, 2004

(65) Prior Publication Data

US 2005/0289308 A1    Dec. 29, 2005

(51) Int. Cl.
*G06F 12/00* (2006.01)
(52) U.S. Cl. .................. 711/114; 711/161; 711/162; 711/112; 711/165; 711/154; 707/204
(58) Field of Classification Search ................ None
See application file for complete search history.

(56) References Cited

U.S. PATENT DOCUMENTS

| | | | | |
|---|---|---|---|---|
| 4,893,307 | A * | 1/1990 | McKay et al. ............... | 370/389 |
| 5,021,949 | A * | 6/1991 | Morten et al. ............... | 709/231 |
| 6,763,442 | B1 | 7/2004 | Arakawa et al. | |
| 6,766,430 | B1 | 7/2004 | Arakawa et al. | |
| 6,779,078 | B1 | 8/2004 | Murotani et al. | |
| 2003/0149835 | A1 * | 8/2003 | Allen et al. .................. | 711/112 |
| 2003/0212872 | A1 | 11/2003 | Patterson et al. | |
| 2004/0243699 | A1 | 12/2004 | Koclanes et al. | |
| 2004/0260875 | A1 | 12/2004 | Murotani et al. | |
| 2005/0060506 | A1 * | 3/2005 | Higaki et al. ............... | 711/162 |
| 2005/0065962 | A1 * | 3/2005 | Rowan et al. ............... | 707/102 |
| 2005/0114438 | A1 * | 5/2005 | Bendich et al. ............. | 709/203 |
| 2005/0203910 | A1 * | 9/2005 | Taguchi et al. ............... | 707/10 |

OTHER PUBLICATIONS

Furuie et al. (A flexible Storage Architecture for Large PACS; Computers in Cardiology 2002:405-408).*
IPStor, Product Line Description, copyright 2004.
EMC AVALONidm, Data Sheet, copyright 2003.
3PARdata Announces X-Series Controller and Software Enhancements, Evaluator Group, Inc., Product Announcement, Mar. 8, 2004, pp. 1-2.
Internet Draft, Definition of Managed Objects for SCSI Entities, Jul. 2002, pp. 1-62.

* cited by examiner

*Primary Examiner*—Mano Padmanabhan
*Assistant Examiner*—Mardochee Chery
(74) *Attorney, Agent, or Firm*—Townsend and Townsend and Crew LLP

(57) ABSTRACT

A storage virtualization system is disclosed for performing data migration operations among the virtual LU (logical units) defined by the system. In one aspect of the present invention, the selection of a target virtual LU is based on a policy that makes a recommendation relating to the target virtual LU. The recommendation is based on the IO activity of the physical devices which constitute the virtual LUs. In another aspect of the present invention, a replacement policy is recommended to replace a current policy. The replacement policy is based on the IO activity of the physical devices which constitute the virtual LUs.

20 Claims, 9 Drawing Sheets

| Port ⌐11 | WWN ⌐12 | Virtual LU ⌐13 | Class ⌐14 | Access Rate/hour ⌐15 | Previous I/O counter/hour ⌐16 |
|---|---|---|---|---|---|
| 1 | 10.00.00.00.C9.36.07.AD | 1 | Online | 10 % | 0 |
| 2 | 10.00.00.00.C9.36.07.EC | 2 | Online | 0 % | 384,984,024 |
| 3 | 10.00.00.00.C9.31.07.FD | 2 | Online | 0 % | 13,920 |
| | ... | | ... | ... | |

Fig. 5

| Location ⌐41 | | | Class of location ⌐42 | Size ⌐43 |
|---|---|---|---|---|
| Port | WWN | Virtual LU | | |
| 1 | 10.00.00.00.C9.36.07.AD | 2 | Online | 3GB |
| 2 | 10.00.00.00.C9.36.07.EC | 2 | Nearline | 2GB |
| 3 | 10.00.00.00.C9.31.07.FD | 2 | Offline | 2GB |
| | .. | .. | .. | |

Fig. 6

| Policy | Rule | Current (34) | Recommendation (35) | User Selection (36) |
|---|---|---|---|---|
| Migration | Rate of IOs on Off - line is under L %. Rate of IOs on Near - line is above L % and under N %. Rate of IOs on On - line is under N % | L = 80 M = 60 | L = 30 M = 10 | L = M = |
| ... | ... | ... | ... | ... |

Fig. 10

METHOD FOR CONTROLLING STORAGE POLICY ACCORDING TO VOLUME ACTIVITY

BACKGROUND OF THE INVENTION

The present invention relates generally to data storage systems and in particular to migration of data in a data storage system.

Current policy based storage management systems can result in unpredictable migration of data even if a user (e.g., an administrative user) specifies criteria for when data migration is to be performed and the target(s) of the migration. The reason is that the user may lack certain current information such as a new configuration due to the addition of new equipment.

Typical data management software manages data based on usage characteristics and the value of the information to the enterprise to determine whether or not migration operations on data will be performed. The software automatically manages data based on user-defined policy(ies) as the correct policy over a long period of time; the policy would be change because the administrator doesn't know the whole system and can't find the problem in the system. The policy shows that the result is better. The policy changes over time because the user (e.g., administrator) does not possess a complete view of the system and thus is not aware of a problem in the system that could change the policy. Consequently, the resulting migration of data can be mistakenly viewed as being proper.

SUMMARY OF THE INVENTION

According to one aspect of the present invention, data migration in a storage virtualization system is performed based on a policy which makes a recommendation as to a target of the data migration. The user can take the recommendation of selecting her own target. The policy is based on one or more IO activity metrics obtained from the physical devices which constitute the virtual LUs (logical units) that are provided by the storage virtualization system. According to another aspect of the invention, the policy can be changed based on the IO activity metrics.

BRIEF DESCRIPTION OF THE DRAWINGS

Aspects, advantages and novel features of the present invention will become apparent from the following description of the invention presented in conjunction with the accompanying drawings, wherein:

FIG. 5 shows a table for maintaining information relating to IN-USE virtual LUs;

FIG. 6 shows a table for maintaining information relating to FREE virtual LUs;

FIG. 10 is an example of a GUI for presenting a new policy.

DESCRIPTION OF THE SPECIFIC EMBODIMENTS

Figure 2:
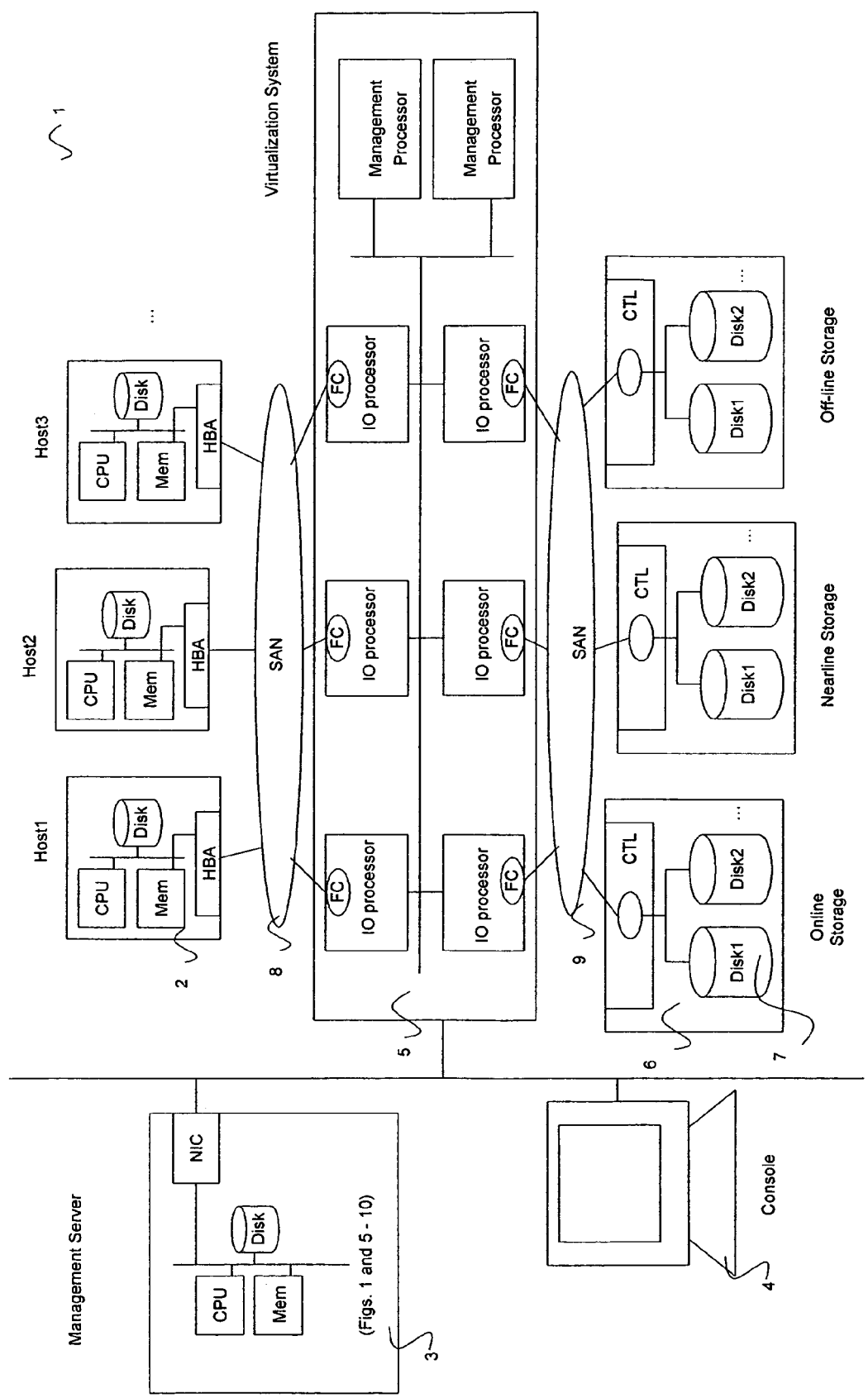
FIG. 2 shows a generalized block diagram of a system according to one embodiment of the present invention.

FIG. 2 is a diagram illustrating the hardware components and interconnections among components according to one embodiment of the invention. A system 1 includes a plurality of hosts 2 (Host 1, Host 2, Host 3) in data communication with a suitable communication network 8. In the particular embodiment of the present invention shown in the figure, the network 8 is a SAN (storage area network). Each host 2 can be configured with a CPU (central processing unit), memory, FC (fibre channel), HBA (host bus adapter), and disk-storage. Each host may run on an OS (operating system) such as Windows, Solaris, and AIX and so on.

The network 8 is in data communication with a storage virtualization system 5. A second communication network 9 connects the storage virtualization system 5 to a plurality of storage components 6. The second communication network 9 is a SAN.

A management server system 3 is connected to the storage virtualization system 5 over a communication network 10. As shown in FIG. 2, a LAN (local area network) is a typical network that is suitable as the communication network 10. The management server system 3 can be configured with a CPU, memory, and disk-based storage. The management server system 3 can run an OS such as Windows, Solaris, AIX, and the like. As will be discussed below, the management server system 3 is configured to operate in accordance with the present invention.

A user such as a system administrator, can be connected to the communication network 10 using a suitably configured console 4 such as a PC (personal computer) or the like. The management server system 3 and the console 4 can communicate using a protocol such as TCP/IP based Ethernet, Token-Ring, FDDI (fibre distributed data interface), and the like.

An example of a storage virtualization system 5 is the MDS 9000 SERIES of multilayer switches manufactured and sold by Cisco Systems, Inc. Another example of a storage virtualization system is an enterprise PC server system based on the IPStor® Enterprise Edition software produced and sold by FalconStor Software.

As can be seen in FIG. 2, the hardware comprising the storage virtualization system 5 includes a plurality of IO processors, each having a FC (fibre channel) port. The FC ports are coupled to the hosts 2 and to the storage components 6. The FC ports can be identified by the WWN(world wide name) which is a convention that is used within the FC specification for assigning a unique identifier to each element within an FC fabric.

The storage virtualization system 5 is further configured with one or more management processors for management of the virtualization system. An internal bus interconnects the internal components of the storage virtualization system 5. The management processors perform the processing necessary to present the hosts 2 with a view of plurality virtual LUs (logical units). Each virtual volume comprises portions of one or more LUs provided by storage subsystems 7 in the storage components 6. Communication with the storage components 6 can be based on SCSI-2 or SCSI-3 command sets (small computer system interface).

Figure 3:
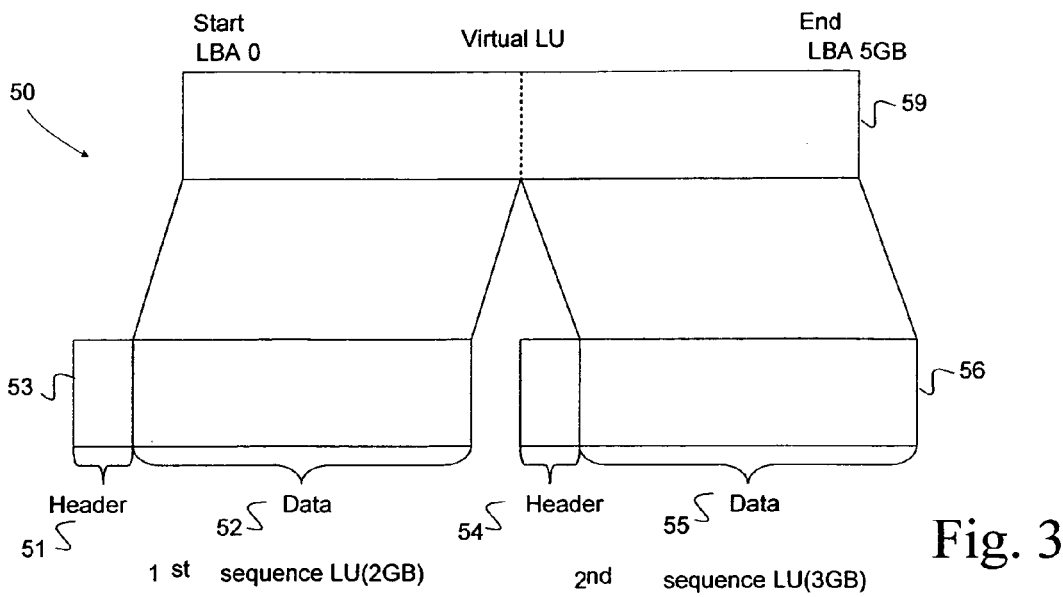
FIG. 3 shows a virtual LU as one or more LUs defined on physical storage.

Referring to FIG. 3 for a moment, a virtual LU 59 is shown having a five GB capacity. The virtual LU 59 comprises LUs provided by two or more physical devices 7 (FIG. 2). A first physical device provides a first LU 53 with a two GB capacity. A second physical device provides another LU 56 with three GB capacity. The management processors in the storage virtualization system 5 manage the individual LUs provided by the storage components 6 and define a plurality of virtual LUs to the hosts 2. This will be discussed in further detail below.

The storage components 6, each comprises a plurality of storage subsystems 7 and an 10 controller. The IO controller defines LUs among the storage devices in a storage component 6, and can be RAID-configured storage (redundant array of inexpensive disks), or the like.

Each IO controller in a storage component 6 comprises a control processor, memory, and a network interface card (NIC) such as an ethernet board or an FC port. In the configuration shown in the figure, the NIC is an FC port for connection to the SAN 9. The control processor may include non-volatile random access memory (NVRAM). The control processor can store data to the NVRAM and protect it, e.g. from a power failure.

Figure 2A:
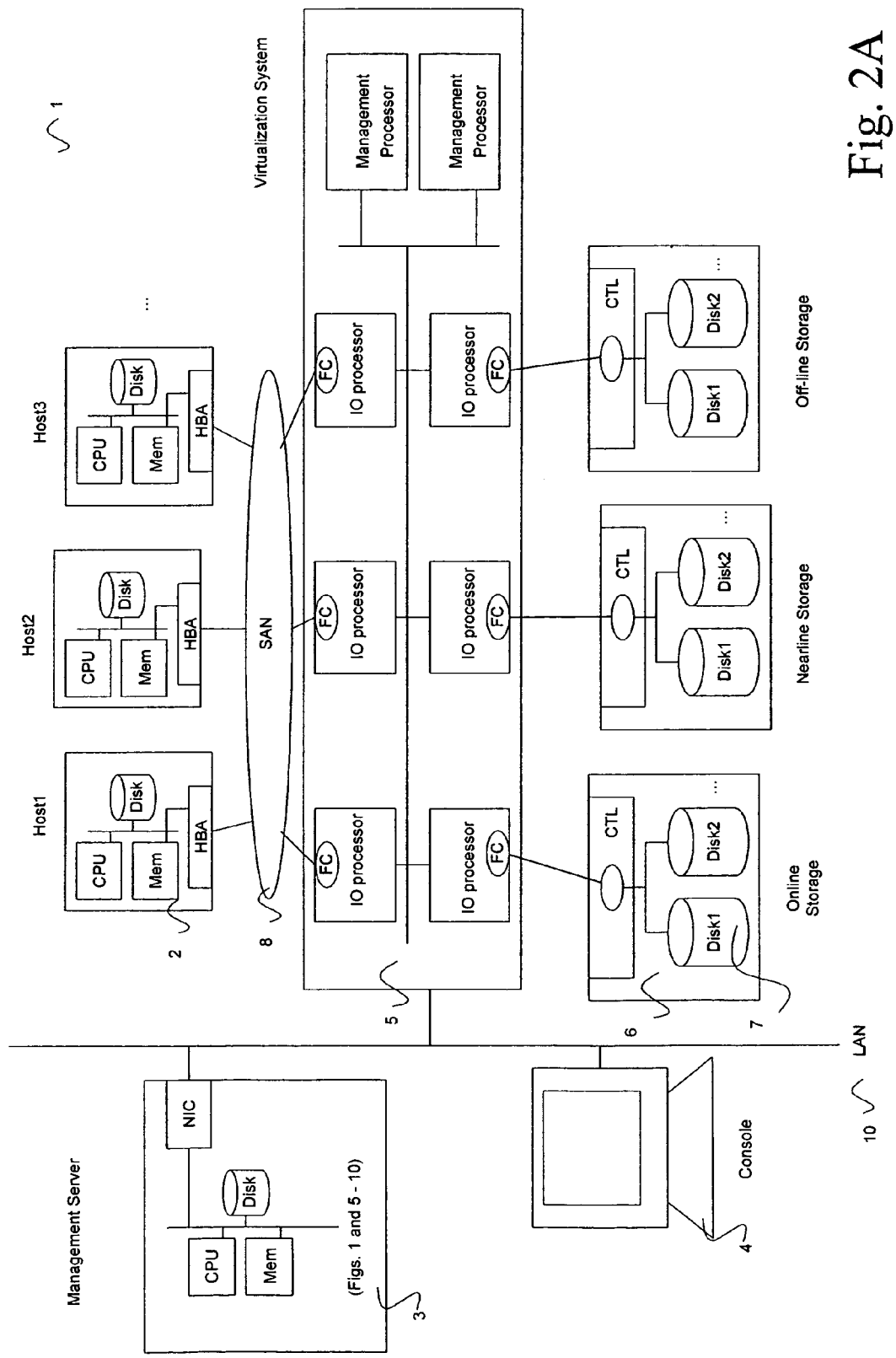
FIG. 2A shows an alternate configuration of FIG. 2.

FIG. 2A shows an alternative configuration of FIG. 2. Here, the storage components 6 are shown connected to the storage virtualization system 5. It can be appreciate from FIGS. 2 and 2A and from the discussion to follow that other storage configurations can be provided.

Figure 4:
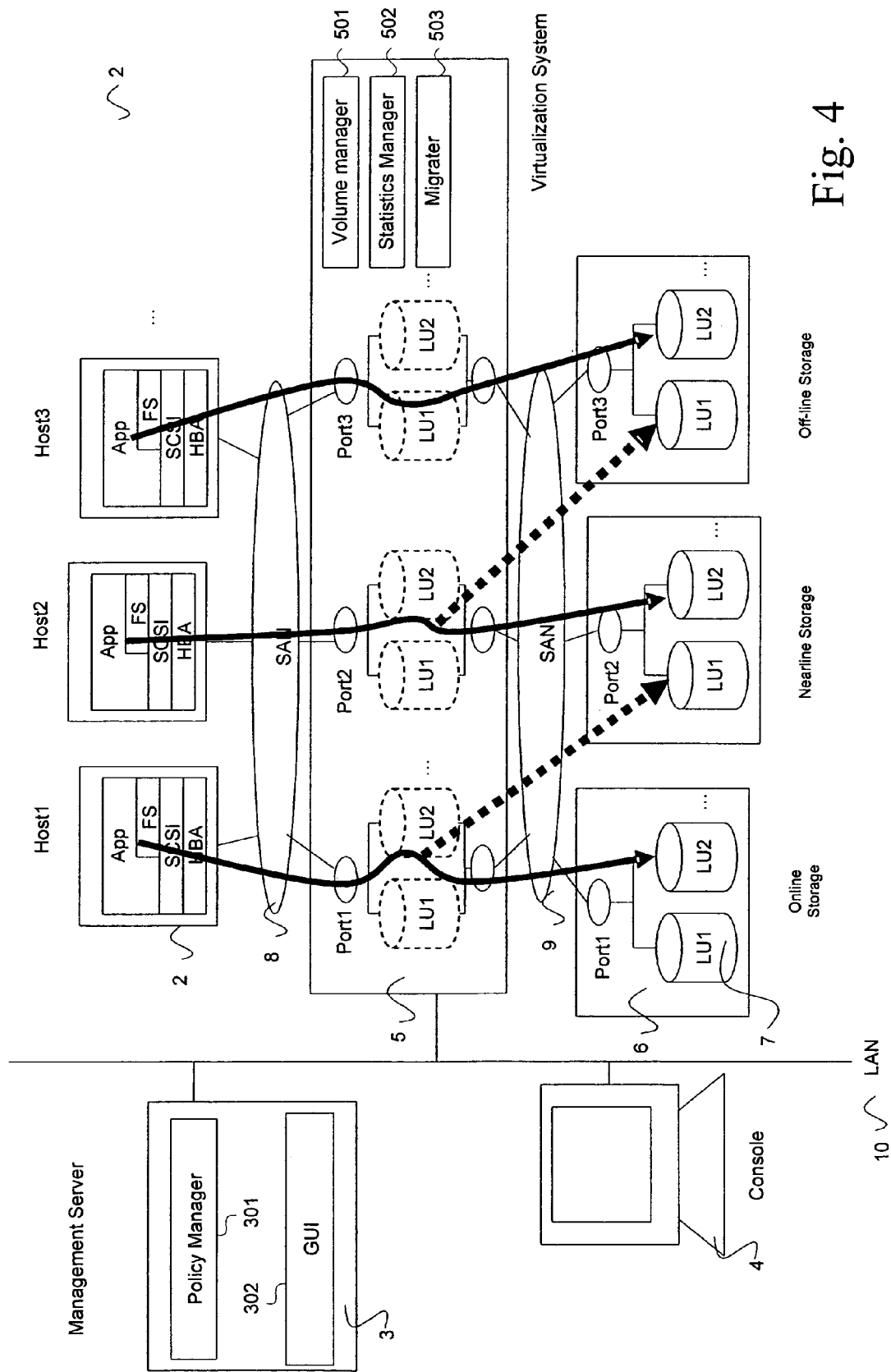
FIG. 4 shows the logical configuration of FIG. 2, illustrating the software components and interconnections among them.

FIG. 4 is a diagram illustrating the software components and interconnections among them for the hardware system illustrated in FIG. 2. In FIG. 4, a solid line is used to indicate the direction of current data access, while a dashed line indicates the direction of data during migration of data from a source virtual LU to a target virtual LU.

Each of the hosts 2 includes a file system (FS) for storing files that are created, accessed, and otherwise manipulated by user applications (App); e.g., a database server might be an application that executes on the host. The figure shows additional detail in each host, namely, there is a SCSI interface by which a host 2 can make read and write requests to the virtual LUs that are provided by the storage virtualization system (e.g., using the SCSI-2 or SCSI-3 command set). It can be appreciated that the OS running on a host 2 includes the necessary driver software to communicate using the SCSI interface.

The management server 3 provides management over the storage virtualization system 5. The management server 3 includes a policy manager 301 and a GUI generator 302 to manage the policy manager. The policy manager collects activity information from the storage virtualization system 5 for the virtual LUs. For example, statistical information such as data access rate can be accumulated for each virtual LU. The policy manager 301 can implement a migration policy in which a candidate virtual LU can determined based on the virtual LU statistics and make a recommendation to an administrator by presenting the candidate virtual LU as a possible target for migration of data from a source virtual LU. The policy manager 301 can implement a threshold-based policy for selecting a candidate virtual LU. New thresholds can be determined from the collected statistics, thus altering the policy. The policy manager 301 initiates migration operations. These aspects of the present invention will be discussed in further detail below. The GUI generator 302 creates a suitable interface (e.g., graphical user interface) that can be presented at console 4. A suitable language for developing GUI's include languages such as HTML (hypertext markup language) and Java.

It can be appreciated that the functionality of the policy manager 301 can be provided in the storage virtualization system 5. An external computer system (e.g., console 4) can access the functionality over the LAN 10.

The storage virtualization system 5 includes a volume manager 501, a statistics manager 502, and a migrater function 503. As mentioned above, the storage virtualization system 5 creates (defines) virtual LUs consisting of LUs defined on the storage subsystems 7. The LUs on the storage subsystems 7 can be configured according to RAID standards; e.g., RAID 0, RAID 1, RAID 5, and so on.

The volume manager 501 creates (defines) the virtual LUs. The volume manager provides an address mapping capability among the LUs on the storage subsystems 7. This is shown in FIG. 3, for example. As mentioned above, the figure shows a 2 GB "real" (physical) LU provided by storage subsystem A and 3 GB "real" LU provided by storage subsystem B. The volume manager can define a single volume as a virtual LU by concatenating the 2 GB LU and 3 GB LU. The term "real" is used to distinguish LUs defined on the physical storage of the storage subsystems 7 from a virtual LU. Each real LU is associated with the following information in order to support the virtual LU of which it is a constituent:

header information 51, 54—The header information informs the virtual manager 501 of the characteristics of each of its constituent real LUs. The header for each real LU is a 512 byte data component and includes an LBA (Logical Block Address) which is the address space of the LU. The header further includes the size of the real LU, its associated virtual LU (port and LUN on port), its configuration (concatenation, RAID0/1/5, and etc), and its sequence order in the virtual LU. For example, the 2 GB LU constitutes the first portion of the virtual LU 50, so its sequence order is "1" (first in the sequence). The 3 GBLU constitutes the second portion of the virtual LU 50, so its sequence order is "2" (second in the sequence). This numbering would continue for addition real LUs in the sequence.

data space 52, 55—The size of the data space in each real LU is the total size of the LU minus size of the header, in this case 512.

LBA 0 in the virtual LU 50 begins with the data space 52 of the $1^{st}$ sequence LU 53. The data space in the virtual LU continues in the data space 55 of the $2^{nd}$ sequence LU 56. This information is maintained by the virtual manager 501, so that it can map the storage address space of the virtual LU 50 to the address space of its constituent real LUs.

The volume migrater function 503 performs the task of migrating on-line data from a "source" virtual LU to a "target" virtual LU. The locations of the real LUs which constitute the source and target virtual LUs can be located in the same storage subsystem 7 or in different storage subsystems.

The statistics manager 502 collects data on the IO activity in each virtual LU. For example, the statistics manager can count the number of IO operations for a period of time to produce a rate of IO operations.

In the embodiment of the present invention shown in FIG. 4, the volume manager 501, statistics manager 502, and volume migrater 503 are processes that run on the storage virtualization system 5. In an alternative embodiment, these functionalities can be provided by management software running on a host device that that is separate from the storage virtualization system hardware. In such an embodiment, the storage virtualization system hardware can comprise a simple FC switching fabric that acts in cooperation with the management software on the host device to provide virtual LU functionality.

The discussion will now turn to the processing that takes place in accordance with the present invention. At some initialization step, the volume manager 501 configures the real LUs defined on the storage subsystems 7 to define a set of virtual LUs. The policy manager 301 discovers the virtual LUs by communicating with the storage virtualization system 5. In accordance with the present invention, two kinds of virtual LUs are considered: FREE virtual LUs and IN-USE (being used for data) virtual LUs.

The discovered virtual LUs are managed in data structures maintained in the policy manager 301. A table is provided for the FREE virtual LUs and another table is provided for the in-use virtual LUs. FIG. 5 shows a table for IN-USE virtual LUs. The information is represented for convenience in tabular format. A row in the table is provided for each IN-USE virtual LU. Each IN-USE virtual LU is associated with a physical port. The Physical Port field 11 contains an identifier that identifies the physical port to which the virtual LU is associated. The world wide name (WWN) that is assigned to the physical port is stored in the WWN field 12. A Virtual LU field 13 identifies the virtual LU by a number.

A Class field 14 identifies the "class" of storage that the virtual LU provides. In accordance with this embodiment of the present invention, the virtual LUs are classified according to certain performance criteria. For example, the embodiment shown defines three classes: ONLINE; NEAR-LINE; and OFFLINE. It can be appreciated of course that other classifications and classification criteria are possible. The ONLINE class refers to virtual LUs that are composed of high performance storage devices. The NEAR-LINE class refers to virtual LUs that are composed of lower performance storage devices. The OFFLINE class refers to virtual LUs composed of remote storage devices, which typically are much slower storage devices. The class names were selected to loosely indicate their location; however, a more generic set of class names could used, for example TIER-1, TIER-2, and TIER-3.

During normal operation of the system, activity information can be gathered. The table shown in FIG. 5 includes an Access Rate field 15 and an IO Counter field 16. The Access Rate field 15 stores an activity metric having units of percentage. The particular activity metric is a measure of IO operations that occur during a period of time. In the particular illustrative embodiment shown in the figures, the period of time is one hour. The Access Rate field 15 stores the change in the access rate of IO operations from one period of time to the next, expressed as a percentage of a theoretical maximum number of IO operations during the same period of time. This will be discussed in further detail below.

The theoretical maximum number of IO operations can be determined from performance data associated with the various hardware components that constitute the virtual LU. For example, the theoretical maximum might simply be an average number of maximum IO operations of each physical storage device that constitutes the virtual LU. Though there are many ways to obtain a theoretical maximum number of IO operations, the idea is to use some constant metric as a basis against which the actual number of IO operations (per unit of time) can be compared.

The IO Counter field 16 maintains a count of the previous number of IO operations, and is updated on the hour concurrently with updating the Access Rate field 15. At every hour, the value in the IO Counter field 16 is subtracted from a current IO counter value to determine a delta value which is used in the manner to be explained below. The current IO counter value is then stored in the IO Counter field 16 to be used at the next hour.

Referring now to FIG. 6, the FREE virtual LU table will be described. The information is shown in tabular format for convenience. A row in the table is provided for each FREE virtual LU. Each row includes a Location field 41. Each FREE virtual LU is associated with a physical port. The Location field 41 includes a Port field that stores an identifier that identifies the physical port to which the virtual LU is associated. The Location field 41 also includes a WWN field to store the WWN that is assigned to the physical port. The virtual LU associated with the row in the table is identified by a number that is stored in the Location field 41. A Class field 42 identifies the class of the virtual LU. A Size field 43 indicates the data capacity of the virtual LU.

The discovery process only partially fills the tables illustrated in FIGS. 5 and 6. A user (e.g., system administrator) will assign each FREE and IN-USE virtual LU to a defined class. The classes defined in this particular embodiment of the present invention are ONLINE, NEAR-LINE, and OFFLINE. In this way, the Class fields 14 and 42 are filled.

Figure 1A:
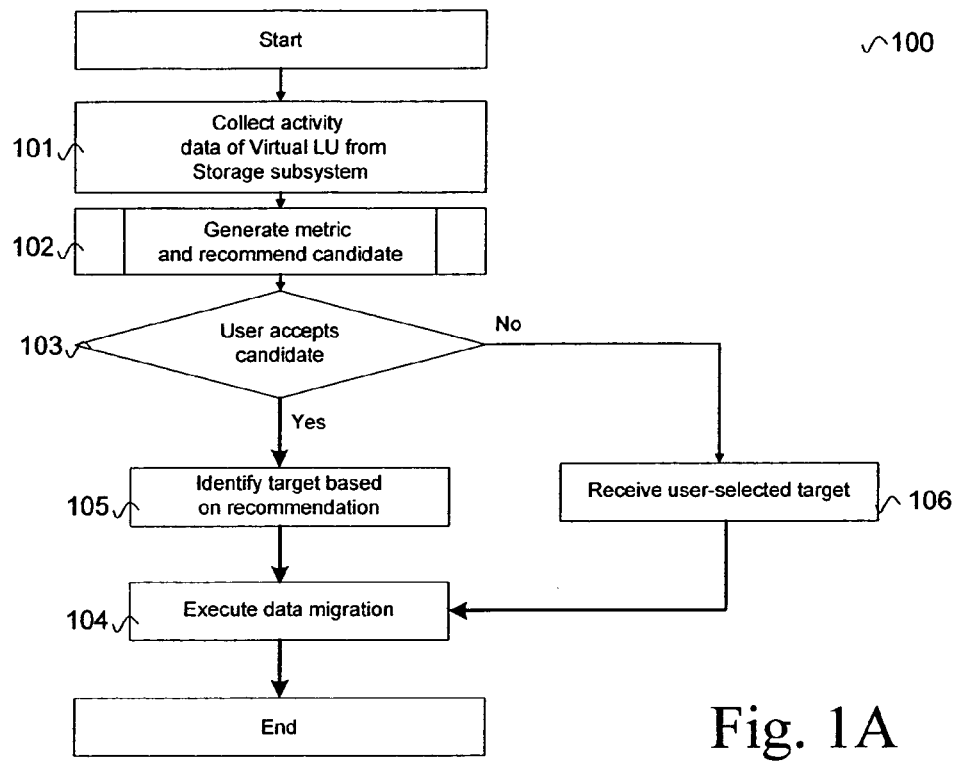
FIG. 1A is a flow chart highlighting processing according to an aspect of the present invention.

Referring now to FIG. 1A, a processing loop 100 for data migration according to an embodiment of one aspect of the present invention will be discussed. In a step 101, the policy manager 301 periodically updates the table shown in FIG. 5 for IN-USE virtual LUs. The policy manager 301 periodically collects statistics information relating to IO activity in the IN-USE virtual LUs and stores the collected data in the IN-USE virtual LU table shown in FIG. 5.

At some points in time, a user such as an administrator will perform one or more data migration operations of the virtual LUs as part of her maintenance duties. In a step 102, the policy manager 301 is invoked by the administrator in preparation for performing a data migration operation. The policy manager 301 will recommend a candidate to be used as a target virtual LU for each IN-USE virtual LU. This includes generating an activity metric as a basis for making the determination that data migration is called for, and to identify a candidate to recommend. As will be explained below, the candidate identifies a class of virtual LUs. In a step 103, the user indicates her choice for a target virtual LU. If the user selects the recommendation, then a target virtual LU is selected-based on the recommended candidate, step 105. If the user decides against the recommendation, then a user-selected target virtual LU is determined in a step 106. In a step 104, the data migration operation is performed on the selected target virtual LU.

Figure 7:
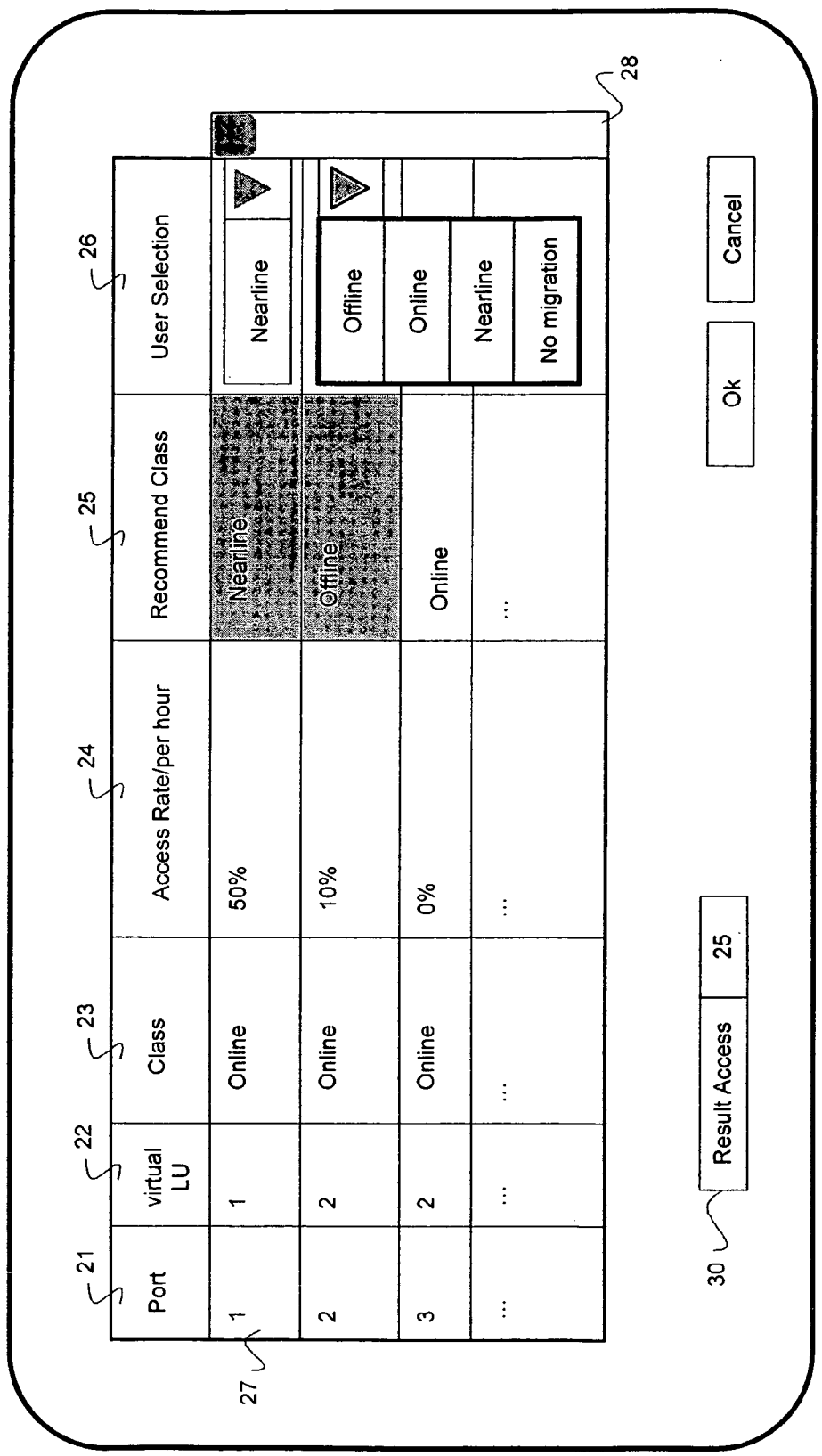
FIG. 7 is an example of a GUI that is presented to the user for choosing between a user-specified target, or a recommended candidate virtual LU.

In an alternative embodiment, the policy manager 301 can automatically perform the data migration operation absent user intervention. In such a case, there is no need to interact with the user as described above. The policy manager 301 can be configured to perform some number of automated data migrations, and then to perform an interactive data migration in which the user is involved. This allows the system to perform automated data migration with an occasional "review" by the user. A typical series of steps might include:

collecting statistics information of each virtual LU, such as IO activity, from the virtualization system calculating the recommendation of a new location the recommended new location of the virtual LU is then determined a data migration operation is then performed Referring for a moment to FIGS. 1 and 7, a GUI (graphical user interface) can be used to present the selection options determined in step 102. The GUI presents a Port field 21, a Virtual LU field 22, a Class field 23, a Access Rate field 24, a Recommended Class field 25, and a User Selection field 26. The information is presented in a conventional GUI window, and includes a vertical scroll bar graphic 28. The scroll bar is used to scroll through the list of virtual LUs within the window.

Each IN-USE virtual LU is identified in the virtual LU field 22, by a row of information 27. The port to which a virtual LU is associated is shown in the Port field 21. The current class to which the virtual LU is classified is shown in the Class field 23. As mentioned above, in the particular embodiment of the present invention that is described, there are three classes: ONLINE, NEAR-LINE, and OFFLINE. The Access Rate field 24 displays a metric that represents the current level of activity for each virtual LU. This metric is obtained from the Access Rate field 15 shown in FIG. 5. The Recommend Class field 25 displays a recommended re-classification of the virtual LU, based on a policy as explained below.

The classification used in this embodiment indicates performance of the devices comprising the virtual LU and is loosely related to the location of the devices. For example, ONLINE refers to devices which are likely to be on-site. The NEAR-LINE class refers to devices that may be in another building, while the OFFLINE class refers to devices that are typically remotely located, and thus have the lowest performance; hence, the particular class names.

The User Selection field 26 allows the user to override the recommendation shown in the Recommend Class field 25. The User Selection field can include a drop-down menu graphic 29 that presents the user with a list of the other classes of virtual LUs. In an alternate embodiment, a separate window can "pop up" to present the user with the list of classes.

By way of the GUI, the user can select a target virtual LU for each IN-USE virtual LU as the target of a migration operation. A "No migration" option can be provided in the drop-down menu 29, allowing the user to decline performing a migration operation for a virtual LU.

Returning to FIG. 1, in step 101 data for the IN-USE virtual LUs is collected from the storage virtualization system 5 on a periodic basis. For example, the illustrated embodiments show a period of one hour. The statistics manager 502 in the storage virtualization system 5 can configured to count the number of IO operations for each virtual LU. The statistics manager can then provide this count information to the policy manager 301 via known protocols, such as SNMP (simple network management protocol) or CIMOM (common information model object manager). The policy manager 301 can collect this information for a virtual LU using SNMP or CIMOM protocols and store it in the IN-USE table shown in FIG. 5 for each virtual LU. In particular, the information is stored in the IO Count field 16. Alternatively, information for the IO Count field 16 can be obtained by using known SCSI commands. For example, the scsiTgtPortInCommands object in scsiTargetStatsGroup can be used to access the information that is stored in the SCSI device. If the IO Count field 16 has a previously stored value, then a delta value is computed by a subtraction operation between the previous value and the obtained value. The obtained value is then stored in the IO Count field 16.

A normalization operation is performed on the delta value. For example, suppose the data collection period is an hour (as shown in FIG. 5). Suppose further that a theoretical IO throughput for an LU is 40,000 IOPS (IOs/sec). Then, the number of theoretical maximum IOs per an hour is 144,000,000. Suppose the number of IOs performed by a particular virtual LU in a given one hour period increased by 14,400,000 operations as compared to the previous one hour period (i.e., the delta value is 14,400,000). The activity rate is the change in hourly rate (i.e., 14,400,000 IOs per hour) expressed as a percentage of the theoretical maximum of 144,000,000 IOs per hour. The result is approximately 10%. This result is stored in the Access Rate field 15 of the table shown in FIG. 5.

Figure 8:
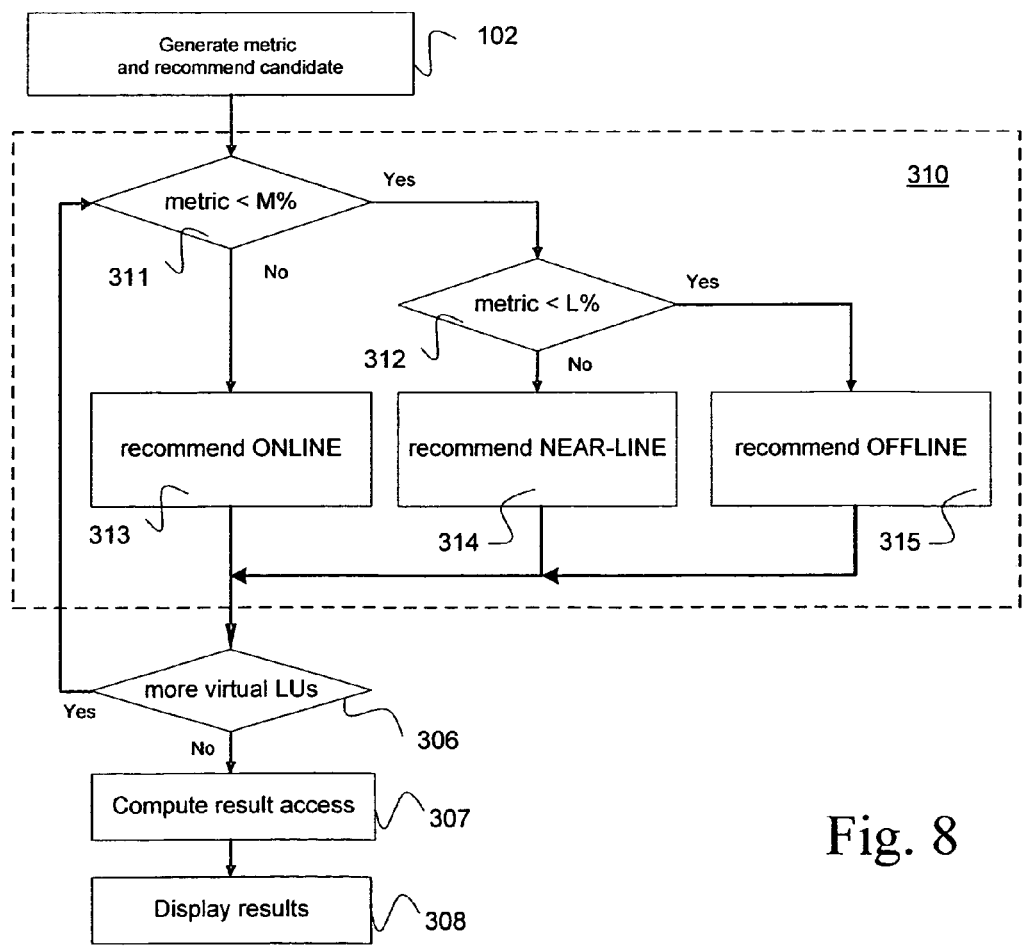
FIG. 8 shows a flow chart for identifying candidate targets.

Referring to FIG. 8, a discussion of a policy 310 that is used to make the selection of a candidate for recommendation (step 102, FIG. 1A) will now be presented. In an embodiment of the present invention, the identification of a candidate is made for each IN-USE virtual LU according to the following policy. In a step 311, if the activity metric (Access Rate field 15) in the virtual LU is less than a first predetermined threshold, M, then consider the next criterion at a step 312. If, on the other hand, the metric is not less than M, then recommend an ONLINE class virtual LU in a step 313. In step 312, if the activity metric is less than a second predetermined metric, L, then recommend an OFFLINE class virtual LU in a step 315. If, on the other hand, the metric is not less than L then recommend a NEAR-LINE virtual LU in a step 314. In accordance with one embodiment of the present invention, L is set to 20 and M is set to 60.

Note that classes of virtual LUs are recommended, thus identifying a set of potential virtual LUs as the target for migration of data contained in a given IN-USE virtual LU. It can be appreciated that additional processing can be performed to identify a specific virtual LU as the candidate for a target of a migration operation. The processing to make such an identification is in fact performed at a later point in accordance with this particular embodiment of the present invention, and is discussed below.

The foregoing steps are repeated for each IN-USE virtual LU, step 306.

To aid the administrator in identifying how the usage pattern of the virtual LUs has changed over time, a result access metric is produced in a step 307 and displayed in a Result Access field 30 of the GUI of FIG. 7. Changes in the usage pattern of the virtual LUs can be determined by comparing the current classification of each IN-USE virtual LU (Class field 23) with its corresponding recommended classification (Recommended Class field 24). The recommended settings reflect suggested changes per the policy 310 based on performance information collected over a given period of time.

Thus, in step 307 a metric is computed in order to provide a numeric indication of the comparison. Various computations can be made. Let "N" be the total number of IN-USE virtual LUs, and let "M" be the number of virtual LUs whose current classification (Class field 23) is the same as it recommended classification (Recommended Class field 24). An example of a metric might be a simple difference "N-M" that can be displayed in the Result Access field 30. Another metric might be M expressed as a percentage of N; i.e., $$\left(\frac{M}{N} \times 100\right)\%.$$

Still another metric might be the difference between M and N, expressed as a percentage of N; i.e., $$\left(\frac{N-M}{N} \times 100\right)\%.$$

In a step 308, the results from the foregoing steps are presented to a user, for example in the GUI display shown in FIG. 7.

The foregoing policy 310 shown in FIG. 8 is one that is implemented in accordance with an embodiment of the present invention. It can be appreciated that any other policy can be used in place of the policy 310 shown in the figure to produce a recommended candidate. Regardless of the particular policy being used, the Result Access can be computed. According to this aspect of the present invention, an indication is provided to the user to show how well the policy is performing based on how often the user selects or does not select the recommendation.

Figure 9:
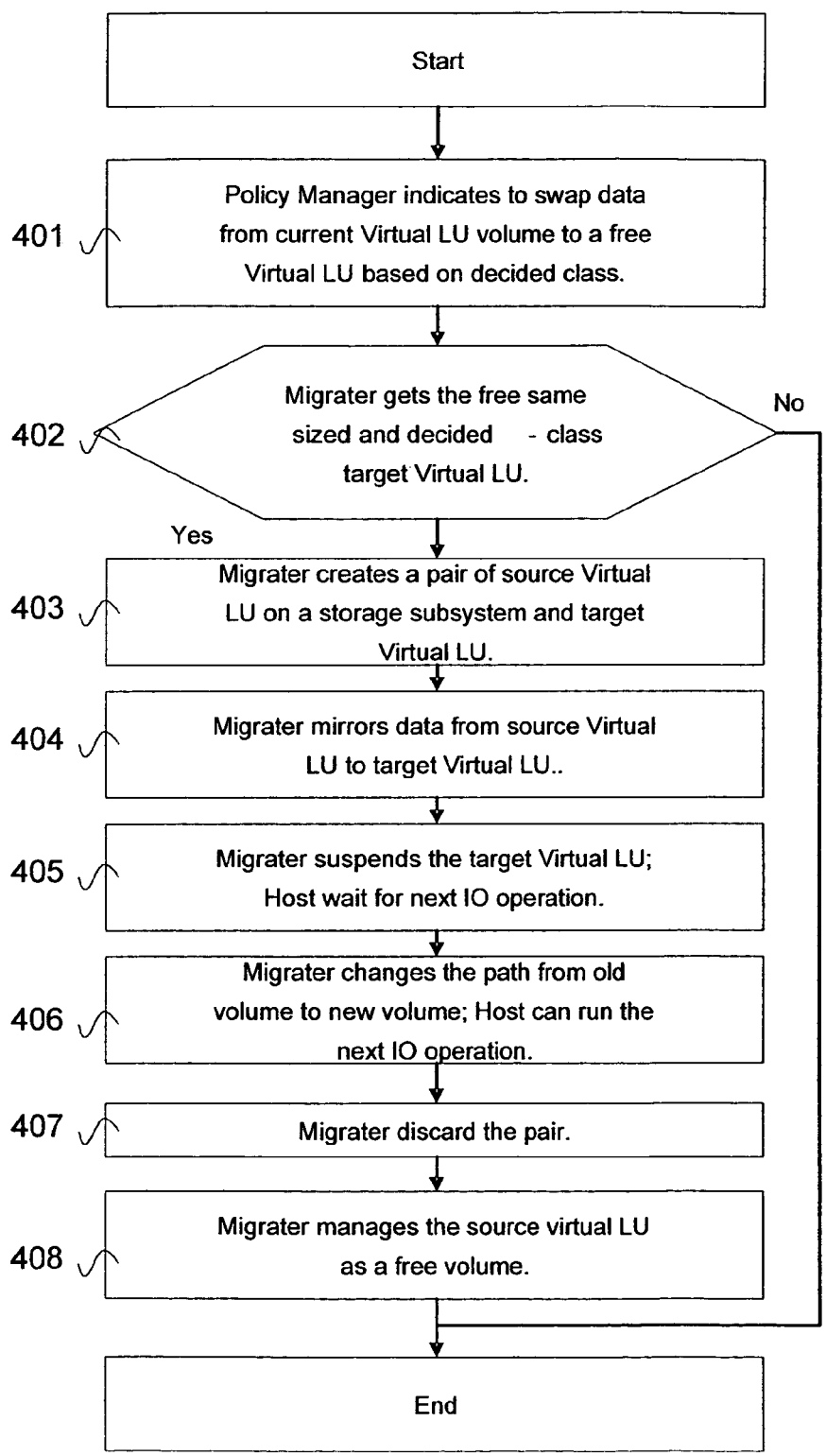
FIG. 9 shows a flow chart for the migration operation.

With reference to FIG. 9, the following processing takes place for step 104 when a migration operation is performed. In a step 401, the policy manager 301 instructs the migrater module 503 to migrate data from a specified source virtual LU to a target virtual LU by specifying the class of the target virtual LU. In a step 402, the migrater module 503 consults the table shown in FIG. 6 for FREE virtual LUs to obtain a suitable target virtual LU. The migrater module 503 considers only those virtual LUs that are of the specified class, and then identifies a virtual LU that has at least the same capacity as the source virtual LU. If none are found, then a suitable error process is performed.

In a step 403, the migrater module 503 creates a pair comprising the source virtual LU and the target virtual LU. Then, in a step 404 the data from the source virtual LU is mirrored to the target virtual LU. In a step 405, after the mirroring operation has completed, the migrater module 503 suspends the source and the target virtual LU. This has the effect of blocking IO operations from any host(s) connected to the source virtual LU. In a step 406, the migrater module 503 reconfigures the data path from the host, so that the target virtual LU is in data communication with the host.

The pair is discarded in a step 407. An entry is created in the IN-USE table shown in FIG. 5 to hold information for the target virtual LU. IO operation in the target virtual LU is then resumed, and by so doing any IO that was blocked in the host will resume and data communication will take place with the target virtual LU. In a step 408, the migrater module 503 creates an entry in the FREE table shown in FIG. 6 and places the source virtual LU in the FREE table.

Figure 1B:
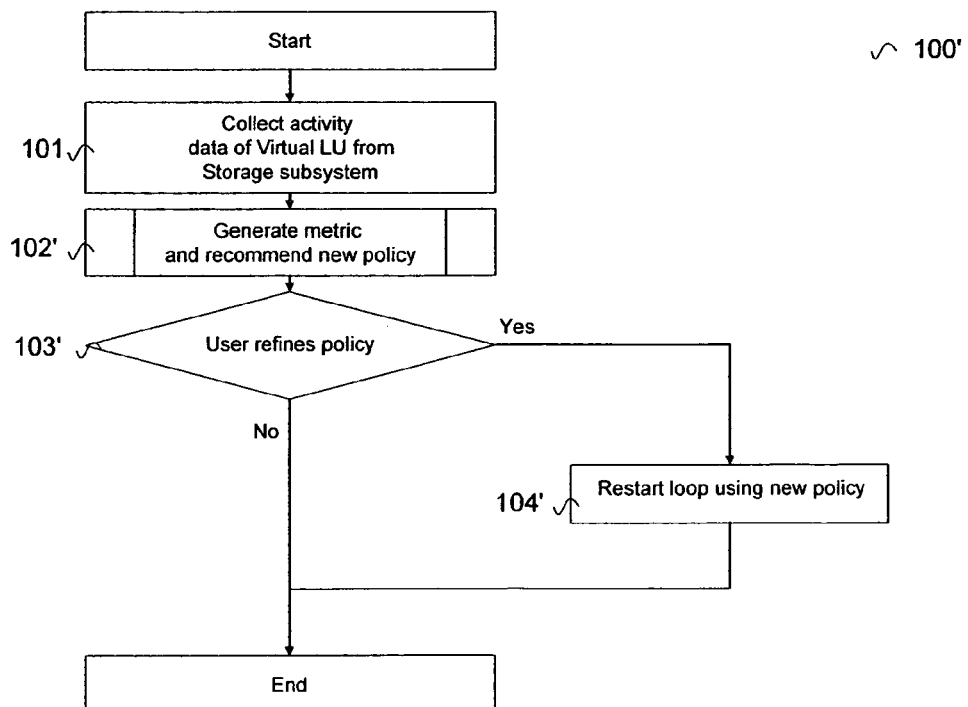
FIG. 1B is a flow chart highlighting processing according to another aspect of the present invention.

Referring to FIG. 1B, in accordance with another aspect of the present invention, the policy manager 301 can determine when a new policy may need to replace an existing policy. The policy manager 301 can provide information about the current policy and make a recommendation for a replacement policy based on activity information obtained from the storage virtualization system 5. A user such as an administrative user can invoke the policy manager 301 to alter the current policy.

In a step 101, the policy manager 301 periodically updates the table shown in FIG. 5 for IN-USE virtual LUs. The policy manager 301 periodically collects statistics information relating to IO activity in the IN-USE virtual LUs and stores the collected data in the IN-USE virtual LU table shown in FIG. 5. This is the same processing as performed in FIG. 1A.

In a step 102', the policy manager 301 determines for each IN-USE virtual LU, whether a migration operation is recommended for that virtual LU and will recommend a new policy to replace the current policy. This includes generating an activity metric as a basis for making the determination that data migration is called for, and to recommend a new policy. This step is discussed in further detail below.

In a step 103', if the user selects the recommended policy, then in a step 104' the data migration process loop 100 shown in FIG. 1A is restarted with the new policy. If the user declines to use the new policy, the process 100' simply terminates.

The policy manager recommends a new policy based on the statistics information collected in step 101. As an example of this aspect of the present invention, using the measured I/O rates for virtual LU and the rate of classes for virtual LUs, the policy manager can generate a new policy in the following manner; the new policy comprises new values of M and L as used in FIG. 8:

Get the number of the maximum IO rates (X %) for each used virtual LU from the IN-USE table shown in FIG. 5.

Get the number of virtual LUs for each class of virtual LUs. Thus, for each class (i.e., ONLINE, NEAR-LINE, and OFFLINE), the number of FREE and IN-USE virtual LUs are summed.

Create class ratios, for example:
ONLINE (total number of virtual LUs is a): a/(a+b+c)%,
NEAR-LINE (total number of virtual LUs is b): b/(a+b+c)%,
OFFLINE (total number of virtual LUs is c)): c/(a+b+c)%

Create a recommendation for a new policy. For example, the policy manager divides the maximum IO percentage by the above ratios:

$L=X^*(1-a/(a+b+c))$ $M=X^*(1-a/(a+b+c)-b/(a+b+c))$

Show the result of new policy.

The results can be presented in a GUI such as shown in FIG. 10 from console. The GUI displays a Name of Policy field 32, a Rule for the Policy field 33, a Current Thresholds field 34, a Recommended Thresholds field 35, and a User Selection field 36. The name of each policy is provided in the Name of Policy field 32. The particular rule(s) associated with the policy is displayed in the Rule for Policy field 33. The threshold values currently in effect for the rule(s) comprising the policy are shown in the Current Thresholds field 34. The recommended thresholds which constitute a new policy are shown in the Recommended Thresholds field 35. The User Selection field 36 allows the user to manually enter her own threshold values, instead of using the recommended values presented in the Recommended Threshold field 35.

After the user selects a policy, the policy manager replaces the old policy with the new one. In the embodiment disclosed, this entails updating the values M and L. Then in step 104', a data migration operation is invoked with the new policy.

What is claimed is:

1. A data migration method in a virtualization system comprising:

determining a plurality of LU (logical unit) classes, wherein each of at least some virtual LUs from among a plurality of virtual LUs is associated with one of said LU classes;

gathering from said virtualization system activity information relating to IO activity in physical devices which constitute a virtual LU; and setting up for a migration operation of a first virtual LU comprising:

determining a candidate LU class based on IO activity relating to said first virtual LU;

presenting said candidate LU class to a user;

presenting a list that identifies said plurality of LU classes; and receiving a selected LU class, said selected LU class being one of said candidate LU class and a user-specified LU class, wherein data contained in said first virtual LU can be migrated to a second virtual LU, said second virtual LU belonging to a target LU class.

2. The method of claim 1 wherein said step of determining is performed according to a policy that is based on said IO activity.

3. The method of claim 2 further comprising replacing said policy with a new policy, said new policy being determined based on said IO activity, said replacing comprising:

determining a candidate policy;

presenting said candidate policy to said user; and receiving an indication from said user to replace said policy with said candidate policy.

4. The method of claim 1 wherein said virtual LUs are categorized as being in-use LUs or free LUs, said free LUs being classified according to said plurality of LU classes.

5. The method of claim 4 further comprising receiving an indication from a user to initiate a migration operation to copy data contained in said first virtual LU to said second virtual LU.

6. The method of claim 1 wherein setting up a migration operation is performed for a plurality of virtual LUs.

7. The method of claim 1 wherein setting up a migration operation further comprises determining a candidate class for a first plurality of virtual LUs and displaying a metric that is based on a comparison between current classifications of said first virtual LUs and candidate classes of said first virtual LUs.

8. A storage virtualization system comprising:

a plurality of physical storage devices, each physical storage device configured as one or more physical LUs;

a virtualization component configured to define a plurality of virtual LUs, each virtual LU comprising one or more of said physical LUs; and a policy manager configured to collect IO activity information from said physical storage devices, said IO activity information being associated with said virtual LUs, said policy manager further configured to perform data migration operations, including, for each virtual LU that has data to be migrated, performing steps of:

identifying a candidate class of virtual LUs from among a plurality of classes of virtual LUs based on said IO activity information associated with said each virtual LU;

presenting to a user a first selection choice comprising information representative of said candidate class;

presenting to said user a second selection choice comprising information representative of one or more of said classes of virtual LUs;

receiving a user selected class of virtual LUs; and identifying a target virtual LU from said user selected class of virtual LUs, wherein a data migration operation of data from said each virtual LU to said target virtual LU can be performed.

9. The system of claim 8 wherein said step of identifying a candidate class of virtual LU is performed according to a policy, wherein said policy manager is further configured to receive a user indication and in response thereto to perform steps of:

generating a candidate policy based on said IO activity information; and presenting said candidate policy as a recommendation to said user, wherein said candidate policy is used to replace said policy.

10. The system of claim 8 wherein said IO activity information is collected using SNMP (simple network management protocol) protocol.

11. The system of claim 8 wherein said IO activity information is collected using CIMOM (common information model object manager) protocol.

12. The system of claim 8 wherein said physical storage devices are SCSI (small computer system interface) devices and said IO activity information is collected by communicating SCSI commands to obtain said IO activity information.

13. A method for data migration in a storage virtualization system comprising:

providing virtual LUs for exchanging data with one or more host systems, a plurality of first virtual LUs being in-use, a plurality of second virtual LUs being free;

performing migration of data from one of said first virtual LUs to one of said second virtual LUs, said one of said second virtual LUs being determined based on a first policy;

gathering IO activity information relating to said first virtual LUs and said second virtual LUs;

producing a candidate policy based on said IO activity information;

presenting said candidate policy as a recommendation to a user;

receiving user-provided information relating to a new policy, wherein said user-provided information can be said candidate policy;

replacing said first policy with said user-provided information, thereby creating a new policy.

14. The method of claim 13 wherein said first policy comprises a plurality of first ranges of IO activity metrics, wherein said candidate policy comprises a plurality of second ranges of IO activity metrics, said second range of IO activity metrics being determined from said IO activity information.

15. The method of claim 13 wherein each of said second virtual LUs belongs to a class from among a plurality of classes, wherein said first policy comprises a rule that defines a plurality of ranges of IO activity metrics, each range of activity metrics being associated with one of said classes, said one of said second virtual LUs being a member of a user-selected class, wherein said user-selected class is determined by:

producing a metric based on said IO activity information that is associated with said one of said first virtual LUs, said metric falling between a first of said ranges of IO activity metrics;

presenting the class associated with said first range of IO activity metrics to said user as a recommendation class, wherein said user can select said recommended class as said user-selected class.

16. A storage virtualization system comprising:

a plurality of storage devices;

a virtualization component configured to define a plurality of virtual LUs, each virtual LU comprising one or more of said physical LUs, said physical LUs being defined on said storage devices;

a policy manager configured to collect IO activity information from said physical storage devices, said IO activity information being associated with said virtual LUs;

said policy manager further configured to perform data migration operations based on a first policy;

said policy manager further configured to replace said first policy with a second policy, comprising steps of:

generating a recommended policy based on said IO activity; and presenting said recommended policy to a user, wherein said second policy is determined from either said recommended policy or from user-provided information representative of a policy different from said recommended policy.

17. The system of claim 16 wherein said policy manager is further configured to perform steps of replacing said first policy with said second policy in response to input from said user.

18. The system of claim 16 wherein said IO activity information is collected using SNMP (simple network management protocol) protocol.

19. The system of claim 16 wherein said IO activity information is collected using CLMOM (common information model object manager) protocol.

20. The system of claim 16 wherein said storage devices are SCSI (small computer system interface) devices and said IO activity information is collected by communicating SCSI commands to obtain said IO activity information.

* * * * *